United States Patent [19]

Sadarnac et al.

[11] Patent Number: 5,646,836

[45] Date of Patent: Jul. 8, 1997

[54] SWITCH MODE POWER SUPPLY USING A SATURABLE INDUCTOR TO PROVIDE A PULSED CURRENT SOURCE

[75] Inventors: Daniel Sadarnac; Sylvain D'Almeida, both of Gif sur Yvette, France

[73] Assignee: Alcatel Converters, Paris, France

[21] Appl. No.: 630,585

[22] Filed: Apr. 10, 1996

[30] Foreign Application Priority Data

Apr. 11, 1995 [FR] France .................................. 95 04327

[51] Int. Cl.⁶ .................................................. H02M 7/44
[52] U.S. Cl. .................................................. 363/98
[58] Field of Search .................................. 363/16, 17, 97, 363/98, 131, 132

[56] References Cited

U.S. PATENT DOCUMENTS

| | | | |
|---|---|---|---|
| 4,908,754 | 3/1990 | Nilsen | 363/98 |
| 5,325,283 | 6/1994 | Farrington et al. | 363/98 |
| 5,539,630 | 7/1996 | Pietkiewicz et al. | 363/98 |

FOREIGN PATENT DOCUMENTS

0608966A2  8/1994  European Pat. Off. .

1011769  6/1952  France .
625976   6/1932  Germany .

*Primary Examiner*—Matthew V. Nguyen
*Attorney, Agent, or Firm*—Sughrue, Mion, Zinn, Macpeak & Seas

[57] ABSTRACT

A switch mode power supply comprises at least one bridge arm including two switching cells in series receiving a direct current voltage to be switched. Each switching cell includes a switching arrangement in parallel with a capacitor and a protection diode. The switching arrangement is alternately closed and opened to supply an alternating current voltage at a switching frequency applied to a load one terminal of which is connected to the common point of the switching cells. A pulsed current source including a saturable inductor is connected to the common point. The saturable inductor is provided by a device including a primary circuit with two windings and a secondary circuit including a single winding to which a direct current source is connected. The windings are wound on a magnetic core and the windings of the primary circuit are connected in parallel and wound in opposite directions. A capacitor is connected in series with the saturable inductor.

9 Claims, 6 Drawing Sheets

PULSED CURRENT SOURCE

PULSED CURRENT SOURCE

SWITCH MODE POWER SUPPLY USING A SATURABLE INDUCTOR TO PROVIDE A PULSED CURRENT SOURCE

BACKGROUND OF THE INVENTION

1. Field of the invention

The field of the invention is that of switch mode power supplies and in particular a zero voltage switching cell using a pulsed current source including a saturable inductor.

2. Description of the prior art

FIG. 1 shows a conventional half-bridge switch mode power supply. A switch mode power supply of this kind is described in "Les alimentations a fréquence de découpage élevée" ("High switching frequency power supplies") by Daniel SADARNAC, ESE 9, Editions Eyrolles, 1993, part of the "Direction des Etudes et Recherches d'Electricité de France" series.

A voltage source supplies a direct current voltage E to a bridge arm including two switching cells 10, 11 in series. The switching cell 10 includes, connected in parallel, switching means T1, a protection diode D1 and a capacitor C1; the switching cell 11 includes, also connected in parallel, switching means T2, a protection diode D2 and a capacitor C2. The capacitors C1 and C2 may be incorporated into the switching means T1 and T2 rather than added externally. The mid-point P of the bridge arm shown is connected to an inductor cell 1 followed by a load which in this instance is a transformer having a primary winding L2 and a secondary winding L3. A capacitor C3 is connected in parallel with the primary winding L2. The other end of the load constituted by the inductor L2 is connected between two capacitors C4 and C5 to which the DC voltage E is applied.

In the secondary circuit of the transformer, two rectifier diodes D3 and D4 cooperate with two inductors LS and a smoothing capacitor CS to provide a DC output voltage VS applied to a load.

The operation of this power supply is described with reference to FIG. 2 which shows four correlated timing diagrams A through D of signals shown in FIG. 1.

The switching means T1 and T2 are power MOSFET, for example, incorporating the protection diodes D1 and D2. A control circuit (not shown) applies to the gates of the transistors T1 and T2 the control pulse is shown in timing diagrams A and B. These pulses have a period T and a relative time offset in order to turn the transistors T1 and T2 on (saturated) and off (cut off) alternately. When a pulse is applied to the gate of one of the transistors, that transistor is turned on. A pulse is applied to the transistor T1 at time t1, at which time the transistor T2 is turned off. The voltage e (timing diagram C) measured between the common point of the capacitors C4 and C5 and the mid-point of the bridge arm is equal to +E/2, which is the voltage across the capacitor C4. The current j (timing diagram D) flowing through the transistor T1 increases and is supplied to the load consisting of the inductor L1 and the transformer primary (inductor L2). The transistor T1 is turned off at time t2 and the inductor L1 opposes fast variations in the current, which causes the capacitor C1 to be charged and the capacitor C2 to be discharged. The voltage e then falls to —E/2 at time t3, whereupon the diode D2 begins to conduct. The capacitor C2 has a low voltage across it at this time. A guard time dt is provided between the end of conduction in one transistor and the start of conduction in the other transistor, to prevent sudden charging and discharging of the capacitors C1 and C2. This reduces losses. When the voltage e has become negative, the current j is reversed and, at time t4, the transistor T2 is turned on in its turn. The phenomenon is then reproduced symmetrically.

This generates a symmetrical AC voltage e producing an output voltage VS that is dependent on the switching period T.

The capacitance value of the capacitors C1 and C2 represents a compromise between losses and switching frequency. If the capacitance value is high, switching losses are reduced but the switching frequency must be relatively low since more time is required to charge and discharge them. On the other hand, their presence is essential to switching at a low voltage, preferably at zero voltage, which is sometimes called "soft switching".

A known disadvantage of this type of switch mode power supply is that it is essential to use the inductor L1 to enable charging and discharging of the capacitors C1 and C2. If the load is a transformer, its primary inductance is too low to generate sufficient capacitor charging and discharging current. At the times the capacitors are charged and discharged, the current j must be high to enable fast charging and discharging. Accordingly, referring to FIG. 2, the current j has to be sufficiently high during the time periods from t2 to t3 and from t5 to t6, it is also high the rest of the time, during which it flows in the transistors T1 or T2 or in the diodes D1 or D2, which causes conduction losses and switching losses. It is then necessary to overspecify the transistors.

Moreover, if the impedance of the load supplied with power by this device decreases, the current j must nevertheless be present and sufficiently high at the switching times. Losses are therefore high in the absence of the load.

Another problem due to the inductor L1 is that it is difficult to construct and is subject to high iron losses. It must be toroidal for reasons of electromagnetic radiation and, to prevent it overheating, it must be overspecified, leading to problems of overall size. In high current applications, for example, for a 500 W switch mode power supply L1 must have an inductance in the order of a few µH and must be able to withstand a current of 15 A. The presence of this inductor reduces efficiency by an amount in the order of 3%. As the iron losses increase in accordance with an approximate $f^2$ law, there is also an upper limit on the switching frequency, which must remain below 1 MHz.

In the case of supplying power to a varying load, or if the voltage E is not fixed, the output voltage VS can be maintained constant only by varying the switching frequency. This increases overall size and cost and introduces electromagnetic radiation problems.

A known solution to these problems is described in U.S. patent application Ser. No. 08/397,773 filed 2nd Mar. 1995, the content of which is hereby incorporated by reference. In the above document, the pulsed current source is an LC type circuit in which the current flowing lags by π/2 relative to the voltage applied to the load, in order to deliver current pulses for alternately charging and discharging each of the capacitors C1 and C2 on the edges of the AC voltage.

FIG. 3 shows one embodiment of a switch mode power supply using this pulsed current source.

The mid-point P of the bridge arm is connected to a pulsed current source 30 comprising an LC type circuit, i.e. a circuit comprising inductors and capacitors, the circuit being specified so that the current flowing in the circuit lags by π/2 relative to the voltage applied to the load 31. The pulsed current source 30 is designed to deliver current pulses for alternately charging and discharging each of the capacitors C1 and C2 on the edges of the AC voltage e. In this example the pulsed current source 30 is connected in parallel with the switching cell 11. It could equally well be connected in parallel with the switching cell 10, as shown in dashed outline. It is also possible to provide a pulsed current source for each switching cell.

Timing diagram D in FIG. 4 shows the trend of the current j supplied by the current source 30, the other timing diagrams (A through C) being identical to those from FIG. 2. The function of the source 30 is therefore to generate a current pulse at the times the switching means open. The current pulses are centered on the rising and falling edges of the voltage e. The current pulses are positive when the voltage e is falling and negative when the voltage e is rising.

The use of an LC type circuit as recommended in the above prior art solution nevertheless requires a considerable amount of wiring if the pulsed current source is a set of LC cells in parallel, and requires precision that increases in proportion to the number of LC cells. Moreover, the overall size, and likewise the cost, are not negligible since a plurality of LC cells are connected in parallel.

Another solution to the problems mentioned above is described in the article "A generic soft switching converter topology with a parallel non-linear network for high power application" by J. A. Ferreira, A. van Ross and J. D. van Wyk, 21st Annual IEEE Power Electronics Specialists Conference, PESC'90 Record, pages 298–304, and also in the article "Pseudo-resonant full bridge DC/DC converter" by O. D. Patterson and D. M. Divan, 18th Annual IEEE Power Electronics Specialists Conference, PESC'87 Record, pages 424–430. This solution consists in providing the pulsed current source in the form of a circuit including a saturable inductor.

FIG. 5 shows a pulsed current source 50 of this kind. A saturable inductor L4 is connected in parallel with a capacitor C6. The pulsed current source 50 can be connected to switching units of the kind used in the source 30 in FIG. 3. The permeability of the inductor L4 decreases as the current applied to it increases and this provides a component having a very low impedance for high currents. In this example the capacitor C6 exercises the function of the capacitors connected to the switching means.

The problem with a current source of the above kind is that iron losses are very high since the current variation traces all of the characteristic B=f(H), where B is the magnetic flux density and H is the magnetic field. To be more precise, the iron losses increase with the flux density B in accordance with an approximate square law. Moreover, the saturation level of an inductor of this kind varies with temperature and from one kind of ferrite (the material routinely used for its manufacture) to another. These various parameter spreads make an inductor of this kind unsuitable for mass-produced switch mode power supplies.

One object of the present invention is to remedy the above drawbacks.

To be more precise, one object of the invention is to provide a switch mode power supply using a low-loss saturable inductor.

SUMMARY OF THE INVENTION

This object, and others that emerge hereinafter, is achieved by a switch mode power supply comprising at least one bridge arm comprising two switching cells in series receiving a direct current voltage to be switched, each switching cell comprising switching means in parallel with a capacitor and a protection diode, said switching means being alternately closed and opened to supply an alternating current voltage at a switching frequency applied to a load one terminal of which is connected to the common point of said switching cells, a pulsed current source comprising a saturable inductor being connected to said common point, wherein said saturable inductor is provided by a device comprising a primary circuit with two windings and a secondary circuit with a single winding to which a direct current source is connected, said windings being wound on a magnetic core and said windings of said primary circuit being connected in parallel and wound in opposite directions, and a capacitor is connected in series with said saturable inductor.

In another embodiment, a switch mode power supply comprises at least one bridge arm comprising two switching cells in series receiving a direct current voltage to be switched, each switching cell comprising switching means in parallel with a capacitor and a protection diode, said switching means being alternately closed and opened to supply an alternating current voltage at a switching frequency applied to a load one terminal of which is connected to the common point of said switching cells, a pulsed current source comprising a saturable inductor being connected to said common point, wherein said saturable inductor is provided by a device comprising a primary circuit comprising first and second windings and a secondary circuit comprising third and fourth windings, said third and fourth windings being connected in series and a direct current source being connected to said secondary circuit, said windings being wound on a magnetic core and said first and second windings being connected in parallel and wound in the same direction, said third and fourth windings being wound in opposite directions, and a capacitor is connected in series with said saturable inductor.

In another embodiment, a switch mode power supply comprises at least one bridge arm comprising two switching cells in series receiving a direct current voltage to be switched, each switching cell comprising switching means in parallel with a capacitor and a protection diode, said switching means being alternately closed and opened to supply an alternating current voltage at a switching frequency applied to a load one terminal of which is connected to the common point of said switching cells, a pulsed current source comprising a saturable inductor being connected to said common point, wherein said saturable inductor is provided by a device comprising a primary circuit comprising first and second windings wound in opposite directions and connected in parallel and a secondary circuit comprising third and fourth windings, said windings being wound on a magnetic core, said third and fourth windings being connected in series and wound in the same direction, a direct current source being connected to said secondary circuit, and a capacitor is connected in series with said saturable inductor.

Other features and advantages of the invention will emerge from a reading of the following description of various embodiments given by way of non-limiting illustrative example and from the appended drawings.

DETAILED DESCRIPTION OF THE PREFERRED EMBODIMENTS

FIGS. 1 through 5 are described above with reference to the prior art.

Figure 1:
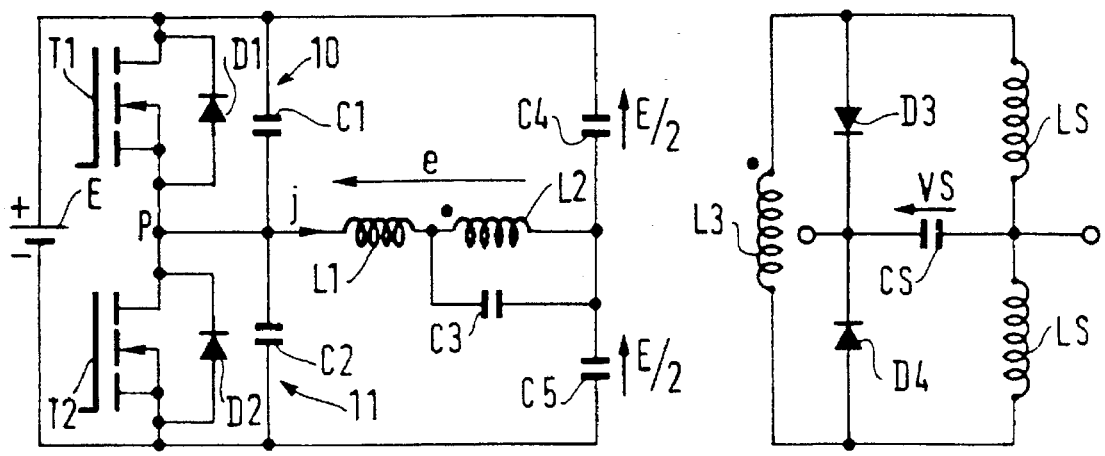
FIG. 1 shows a prior art type switch mode power supply.
Figure 2:
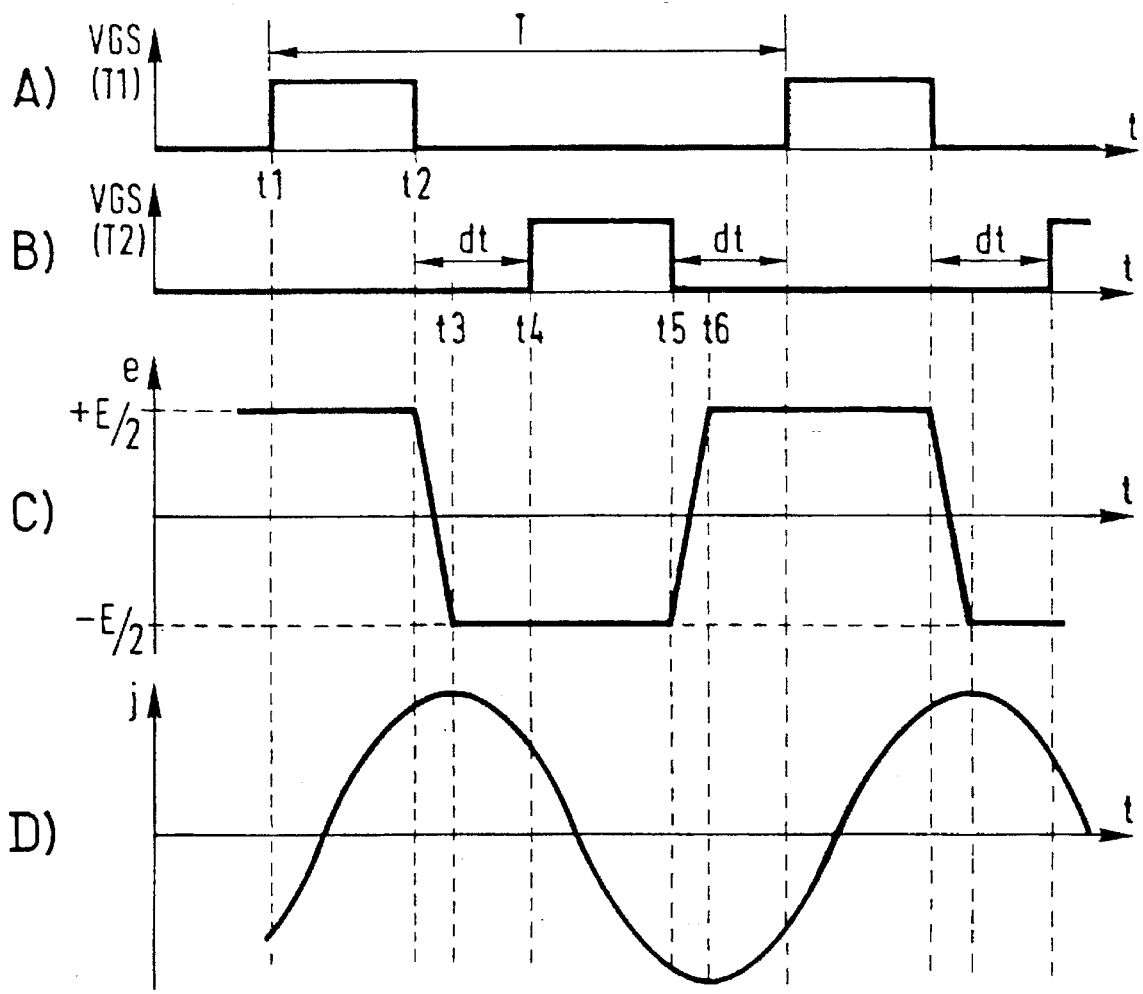
FIG. 2 shows correlated timing diagrams relating to FIG. 1.
Figure 3:
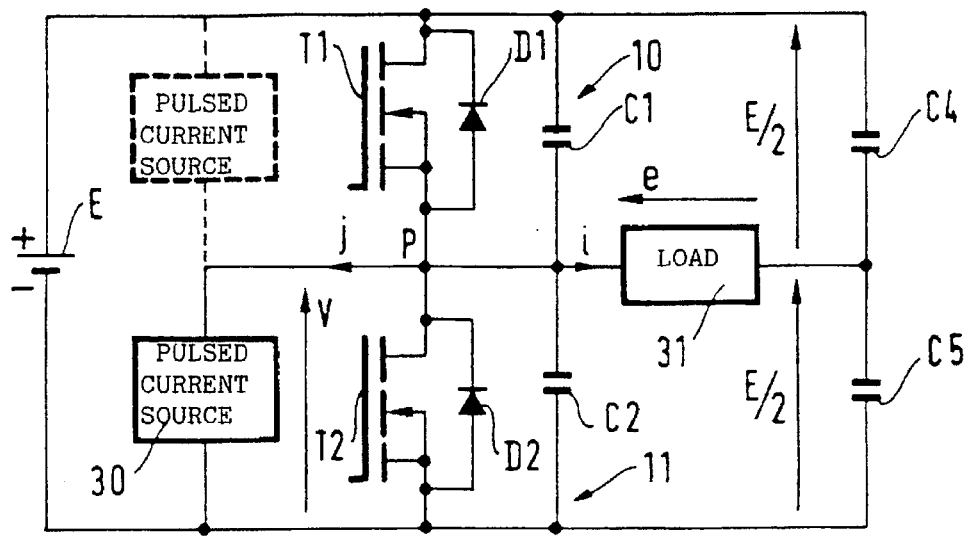
FIG. 3 shows one embodiment of a switch mode power supply using a prior art pulsed current source.
Figure 4:
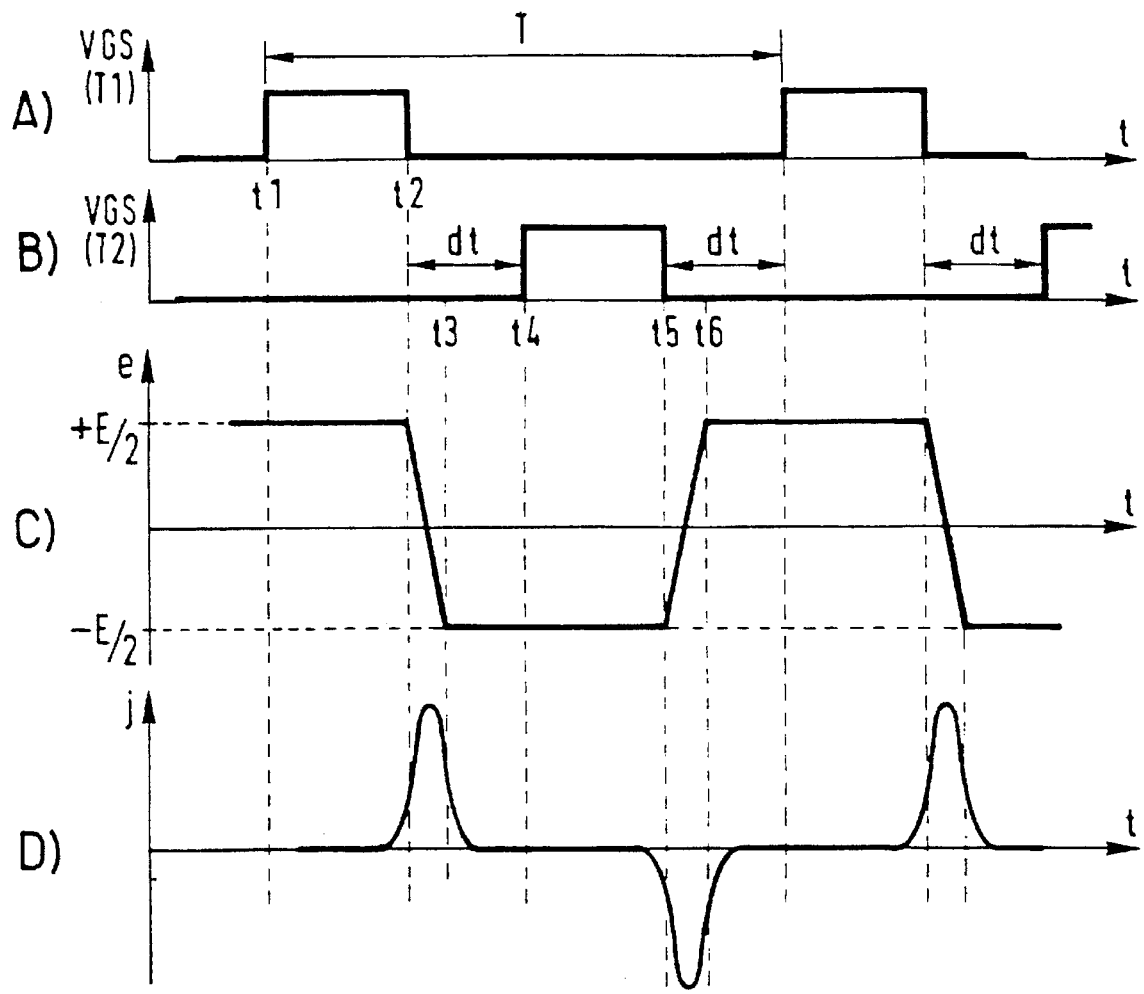
FIG. 4 shows correlated timing diagrams relating to FIG. 3.
Figure 5:
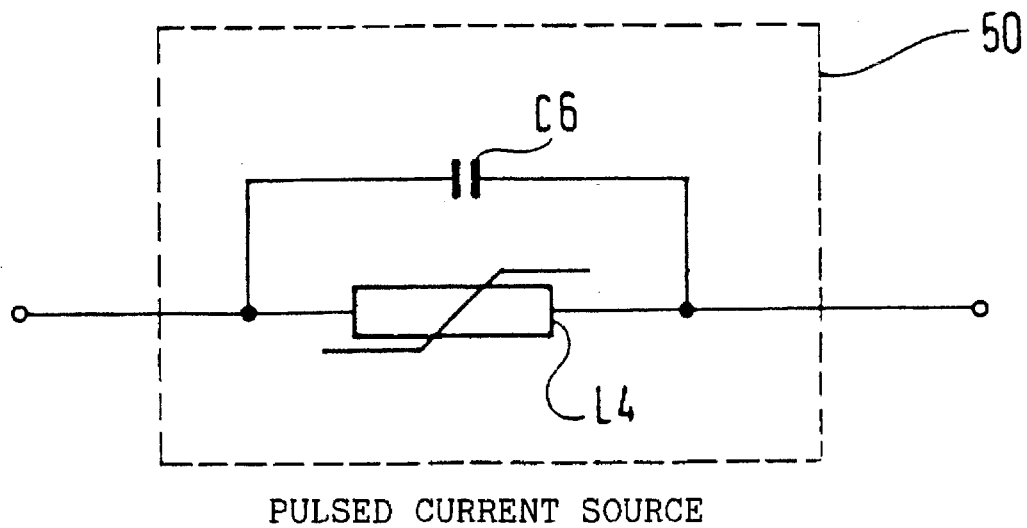
FIG. 5 shows a pulsed current source using a saturable inductor.
Figure 6:
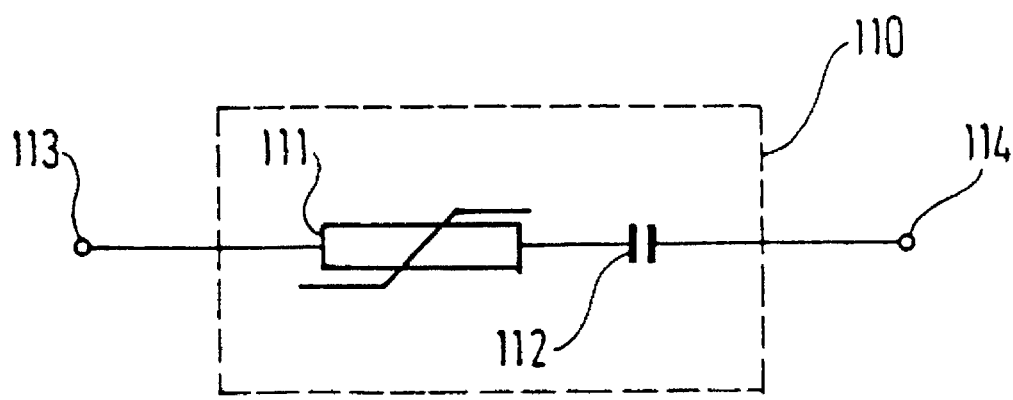
FIG. 6 shows a pulsed current source of the invention.

FIG. 6 shows a pulsed current source of the invention.

The pulsed current source 110 comprises a saturable inductor 111 connected in series with a capacitor 112. It can be used in a circuit such as that shown in FIG. 3, in which the current source 110 replaces the source 30. Connecting terminals 113 and 114 are provided. A capacitor may be connected in parallel with the inductor 111.

Figure 7:
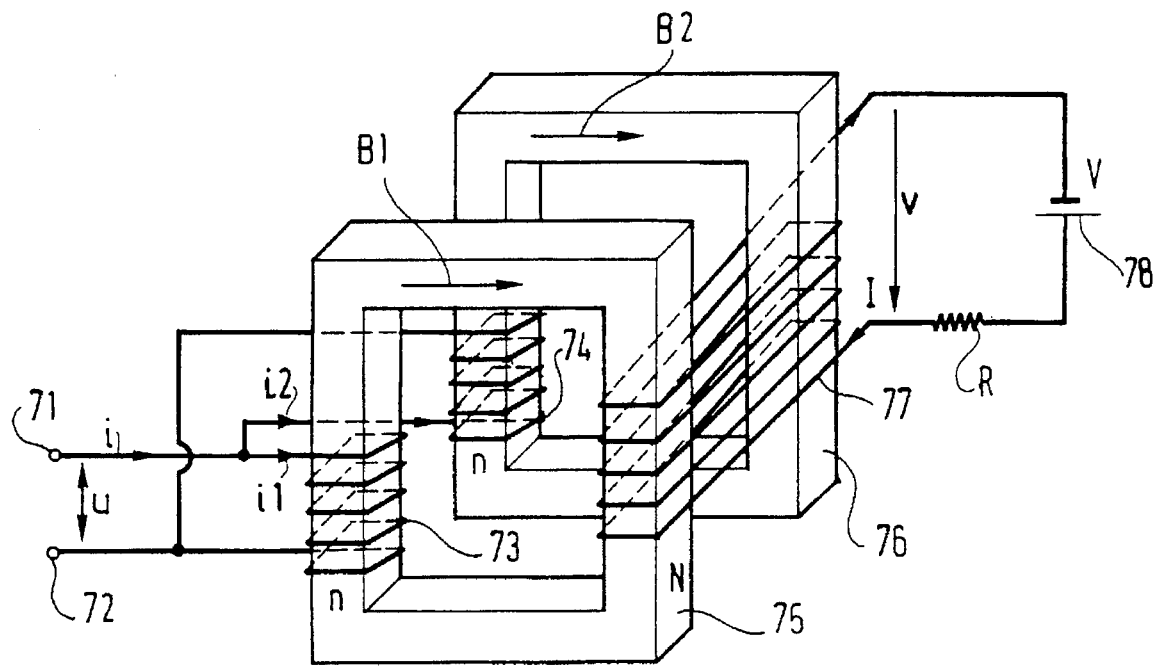
FIG. 7 shows a saturable inductor that can be used to implement a pulsed current source.
Figure 10:
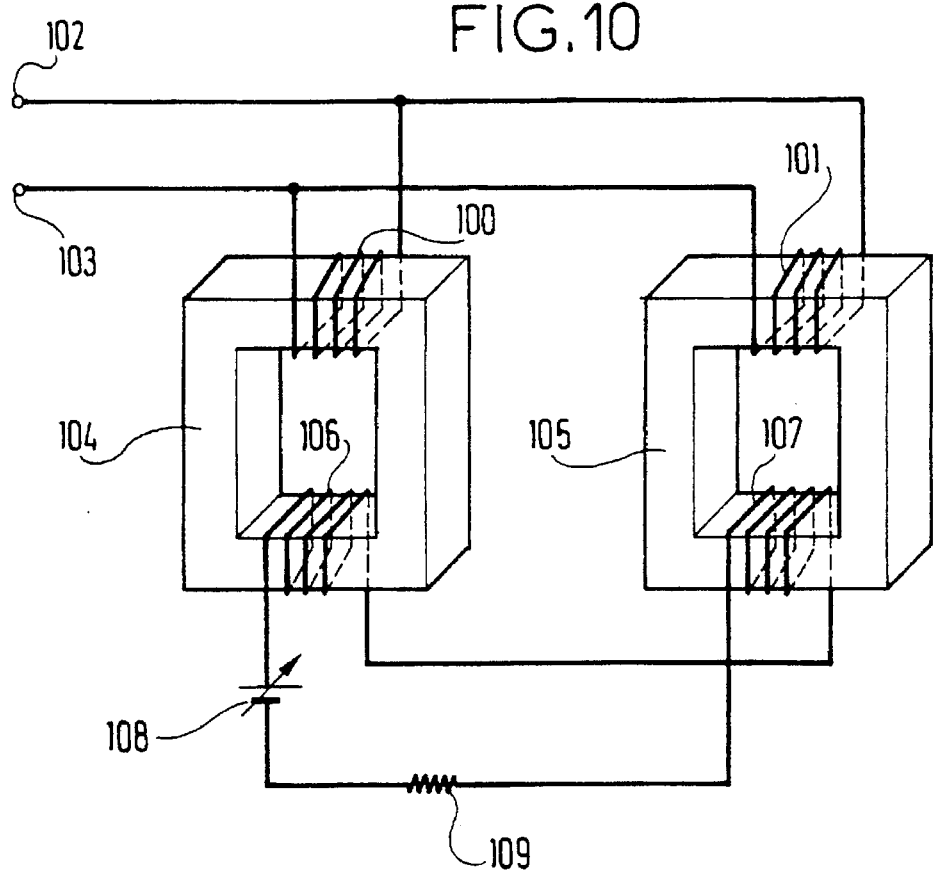
FIG. 10 shows another saturable inductor that can be used to implement a pulsed current source.

The saturable inductor 111 is constructed as shown in FIG. 7 or FIG. 10.

FIG. 7 shows a saturable inductor that can be used to implement a pulsed current source of the invention. An inductor of this kind is described in European patent application N° 0 608 966, for example.

The saturable inductor in FIG. 7 has two terminals 71 and 72 and two windings 73 and 74 connected in parallel and wound in opposite directions on two parts 75 and 76 of a magnetic circuit. The winding 73 is called the first winding and the winding 74 is called the second winding. The secondary circuit comprises a single winding 77 connected to a current source. The current source comprises a DC voltage source 78 generating a voltage V and a series resistor R. The current 1 generated by the source flows through the winding 77 which is common to the two parts 75 and 76 of the magnetic circuit. The magnetic circuit is shown here as two separate cores but it could equally well be in the form of a single core.

The first and second windings 73 and 74 each have n turns and when they are connected to a switching cell carry respective currents $i_1$ and $i_2$ where $i_1+i_2=i$, a voltage u being present at their ends. If it is assumed that the cross-sections of the parts 75 and 76 are the same and equal to $S=S_1=S_2$, then:

$$u = n \cdot S_1 \cdot \frac{dB_1}{dt} \text{ and } -u = n \cdot S_2 \cdot \frac{dB_2}{dt} \quad (1)$$

The voltage v at the secondary is then equal to:

$$v = n \cdot S_1 \cdot \frac{dB_1}{dt} + n \cdot S_2 \cdot \frac{dB_2}{dt} = 0$$

Thus, from Ampere's law:

$$H_1 l_1 = n i_1 + Nl \text{ and } H_2 l_2 = -n i_2 + Nl$$

where $l=l_1=l_2$ is the length of the windings 73 and 74 and N is the number of turns in the winding 77.

The voltage u conditions $B_1$ and $B_2$, variations in $B_1$ being symmetrical to those in $B_2$ if the cross-sections $S_1$ and $S_2$ are the same.

Figure 8:
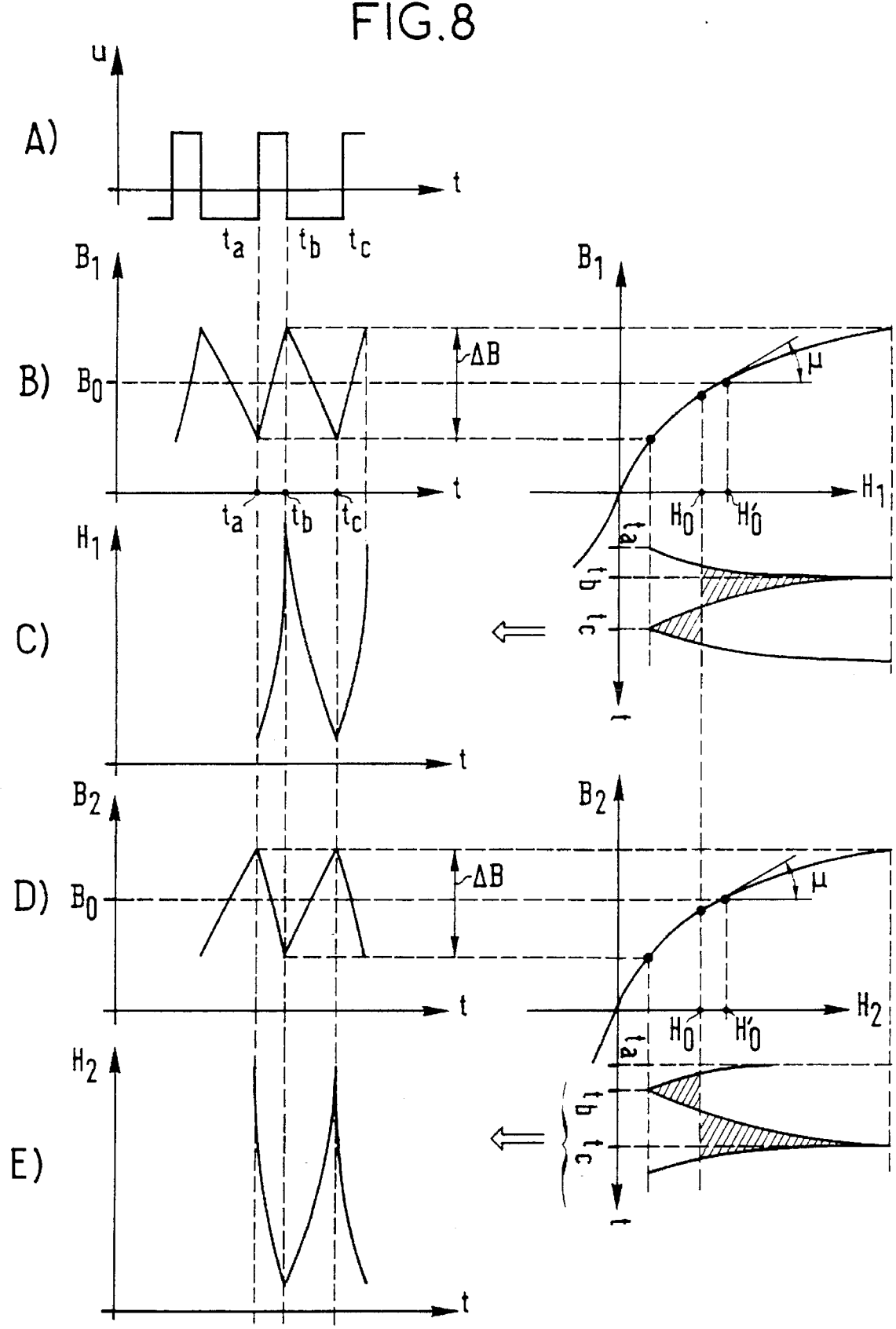
FIG. 8 shows correlated timing diagrams to assist with understanding the function of the inductor from FIG. 7.

FIG. 8 shows correlated timing diagrams illustrating the function of the inductor.

Timing diagram A shows a rectangular switching voltage u which has a zero mean value, timing diagram B shows how $B_1$ varies as a function of time, timing diagram C shows how $H_1$ varies as a function of time, timing diagram D shows how $B_2$ varies as a function of time and timing diagram E shows how $H_2$ varies as a function of time.

In timing diagram A, the voltage u has a zero mean value and is high between ta and tb and low between tb and tc. The voltage u imposes conditions $B_1$ and $B_2$ shown in timing diagrams B and D. The variations in the magnetic flux densities in $B_1$ and $B_2$ are sawtooth in shape (see equation 1).

$B_0$ is the mean flux density. The characteristics $B_1=f(H_1)$ and $B_2=f(H_2)$ depend on the material of the magnetic core, this material also conditioning the value of the magnetic permeability μ, which is very high. It may be assumed that the characteristics $B_1=f(H_1)$ and $B_2=f(H_2)$ are identical, in which case the flux density ripple ΔB is symmetrical. In this case, the mean flux densities $B_1$ and $B_2$ are both equal to $B_0$. Note that the relation $B_0=f(H_0)$ does not apply because of the non-linearity of the B=f(H) curves. In this case $B_0=f(H_0')$. The magnetic fields $H_1$ and $H_2$ have the same mean value $H_0=Nl/l$ if the voltage u has a zero mean value.

The present invention utilizes a material of high magnetic permeability, with the result that the value of $H_0$ is far beyond the elbow in the B=f(H) characteristic, in a non-linear part of that characteristic.

To determine the result of combining the flux densities $B_1$ and $B_2$, let:

$$b_1 = B_1 - B_0$$

$$b_2 = B_2 - B_0$$

$$h_1 = H_1 - H_0$$

$$h_2 = H_2 - H_0$$

$$B = b_1 - b_2 = B_1 - B_2$$

$$H = h_1 - h_2 = H_1 - H_2$$

Accordingly, $$2 \cdot u = n \cdot S \cdot \frac{dB}{dt}$$

and $H.l = n(i_1+i_2) = n.i$

This yields the inductor from FIG. 7.

Figure 9A:
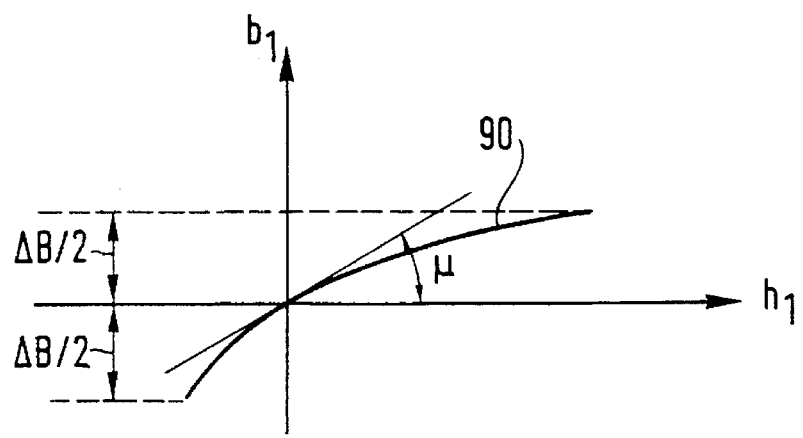
FIGS. 9A, 9B and 9C show features relating to the inductor from FIG. 7.
Figure 9B:
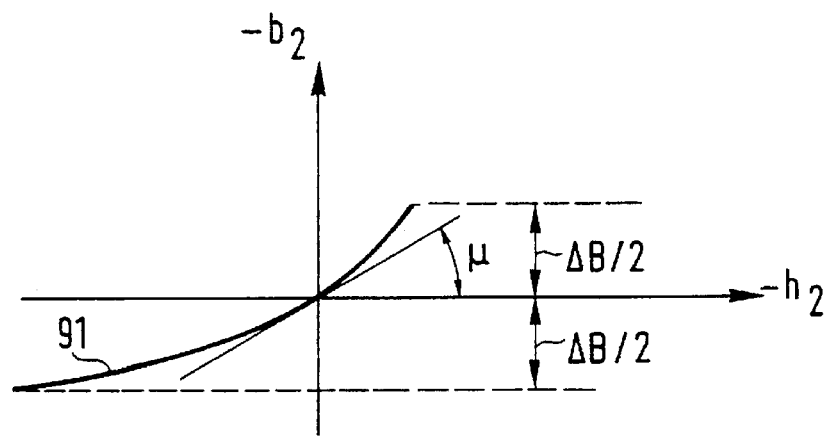
Figure 9C:
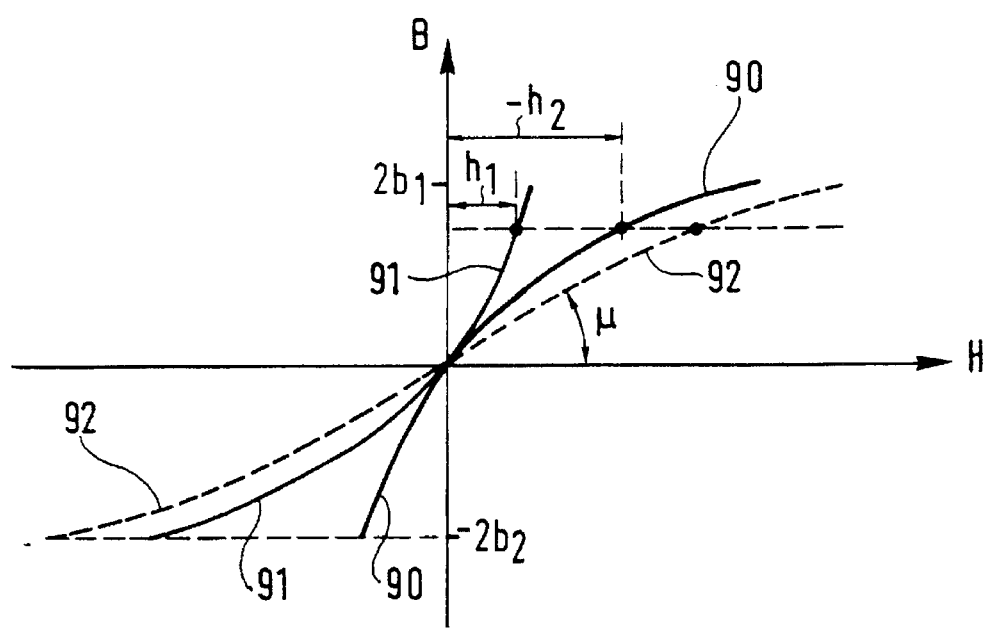

FIGS. 9A and 9B show the magnetic flux densities $b_1$ and $-b_2$ as a function of $h_1$ and $-h_2$, respectively, and FIG. 9C shows the combination of these characteristics occurring upon parallel connection of the windings (wound in different directions) constituting the primary of the inductor from FIG. 7.

At any time, $b_1 = -b_2$, $B = b_1 - b_2 = 2b_1 = -2b_2$ and $H = h_1 - h_2$. This produces the B=f(H) characteristic 92 in FIG. 9C, by superposing the characteristics 90 and 91 from FIGS. 9A and 9B by geometrical construction point by point. The curve 92 obtained corresponds to that obtained for the variable inductor from FIG. 7. The value of μ is set by $H_0$ and therefore by the value of the current 1, which can readily be varied by means of the resistor R or the voltage V, depending on the required result.

This produces a saturable inductor that is varied simply by modifying the current 1. Also, as the alternating flux density components cancel out, the secondary voltage v is a zero voltage. Isolating the primary circuit from the secondary circuit does not represent any particular problem.

The material used for the magnetic circuits can be a ferrite, an amorphous material or an iron-silicon alloy. Other materials can be used, what is essential being that they have a high permeability μ.

The variation in current does not cover all of the B=f(H) characteristic and the iron losses are therefore minimal.

FIG. 10 shows another saturable inductor that can be used to provide a pulsed current source. This embodiment requires high insulation between the primary and the secondary and between the turns of the secondary, however.

In this embodiment the primary circuit comprises first and second windings 100, 101 connected in parallel and wound in the same direction. The saturable inductor has terminals 102 and 103. Each of the primary circuit windings is wound on a separate core 104, 105. The secondary circuit comprises third and fourth windings 106, 107 connected in series and wound in opposite directions on the cores 104 and 105. As previously, a direct current source shown diagrammatically as a voltage source 108 followed by a resistor 109 is connected to the secondary circuit.

To limit the direct current in the secondary circuit, the secondary has a high number of turns. A high voltage is then induced in it, requiring a high performance insulation system.

A variant of this embodiment consists in winding the first and second windings in opposite directions and winding the third and fourth windings in the same direction. The saturable inductor then functions in the same way.

The capacitor 112 (FIG. 6) in series with the saturable inductor eliminates DC components and thus renders the positive and negative pulses symmetrical.

The pulsed current source can be in parallel with at least one of the switching cells 10, 11 or, as mentioned in the previously referred to U.S. patent application Ser. No. 08/397,773, one terminal of the pulsed current source can be connected to the mid-point P and the other of these terminals between two capacitors in series to which the DC voltage E is applied.

There is claimed:

1. A switch mode power supply comprising at least one bridge arm comprising two switching cells in series receiving a direct current voltage to be switched, each switching cell comprising switching means in parallel with a capacitor and a protection diode, said switching means being alternately closed and opened to supply an alternating current voltage at a switching frequency applied to a load one terminal of which is connected to a common point of said switching cells, a pulsed current source comprising a saturable inductor being connected to said common point, wherein said saturable inductor is provided by a device comprising a primary circuit with two windings and a secondary circuit with a single winding to which a direct current source is connected, all of said windings being wound on a magnetic core and said windings of said primary circuit being connected in parallel and wound in opposite directions, and a capacitor is connected in series with said saturable inductor.

2. A switch mode power supply comprising at least one bridge arm comprising two switching cells in series receiving a direct current voltage to be switched, each switching cell comprising switching means in parallel with a capacitor and a protection diode, said switching means being alternately closed and opened to supply an alternating current voltage at a switching frequency applied to a load one terminal of which is connected to a common point of said switching cells, a pulsed current source comprising a saturable inductor being connected to said common point, wherein said saturable inductor is provided by a device comprising a primary circuit comprising first and second windings and a secondary circuit comprising third and fourth windings, said third and fourth windings being connected in series and a direct current source being connected to said secondary circuit, said first through fourth windings being wound on a magnetic core and said first and second windings being connected in parallel and wound in the same direction, said third and fourth windings being wound in opposite directions, and a capacitor is connected in series with said saturable inductor.

3. A switch mode power supply comprising at least one bridge arm comprising two switching cells in series receiving a direct current voltage to be switched, each switching cell comprising switching means in parallel with a capacitor and a protection diode, said switching means being alternately closed and opened to supply an alternating current voltage at a switching frequency applied to a load one terminal of which is connected to a common point of said switching cells, a pulsed current source comprising a saturable inductor being connected to said common point, wherein said saturable inductor is provided by a device comprising a primary circuit comprising first and second windings wound in opposite directions and connected in parallel and a secondary circuit comprising third and fourth windings, said first through fourth windings being wound on a magnetic core, said third and fourth windings being connected in series and wound in the same direction, a direct current source being connected to said secondary circuit, and a capacitor is connected in series with said saturable inductor.

4. A switch mode power supply according to claim 1 wherein said pulsed current source is in parallel with at least one of said switching cells.

5. A switch mode power supply according to claim 1 wherein one terminal of said pulsed current source is connected to said common point and the other terminal is connected between two capacitors in series to which said direct current voltage is applied.

6. A switch mode power supply according to claim 2 wherein said pulsed current source is in parallel with at least one of said switching cells.

7. A switch mode power supply according to claim 2 wherein one terminal of said pulsed current source is connected to said common point and the other terminal is connected between two capacitors in series to which said direct current voltage is applied.

8. A switch mode power supply according to claim 3 wherein said pulsed current source is in parallel with at least one of said switching cells.

9. A switch mode power supply according to claim 3 wherein one terminal of said pulsed current source is connected to said common and the other terminal is connected between two capacitors in series to which said direct current voltage is applied.

* * * * *